P. BALKO & A. KOCOVSKY.
NON-SKID DEVICE.
APPLICATION FILED SEPT. 15, 1916.
1,236,251.
Patented Aug. 7, 1917.
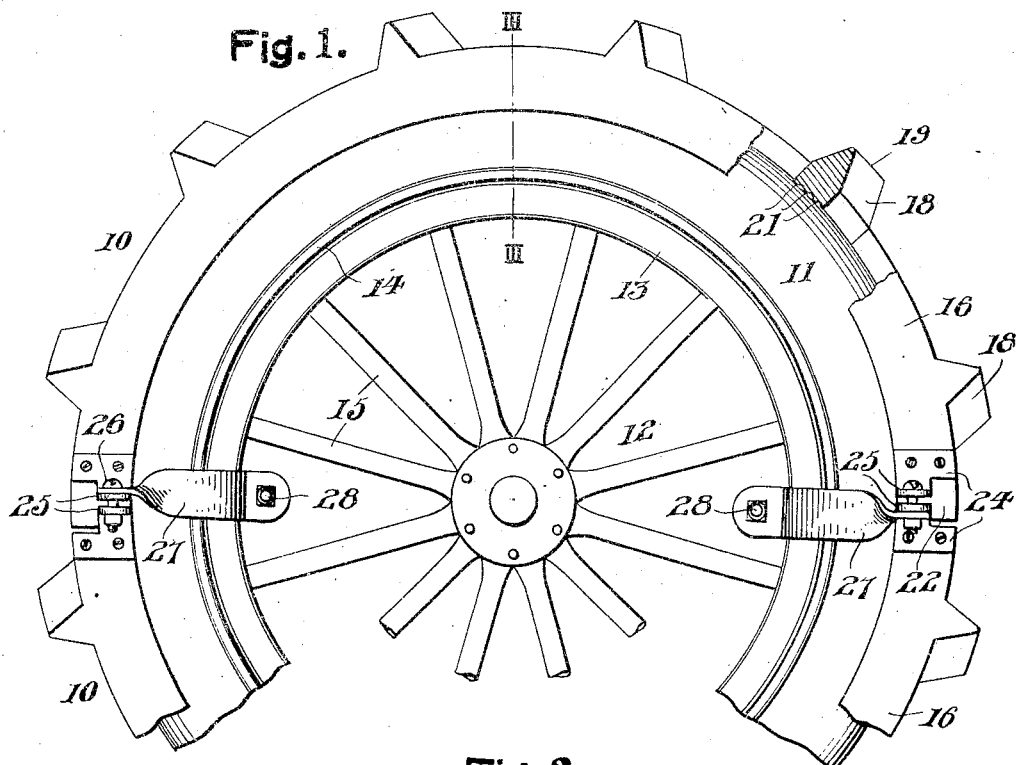
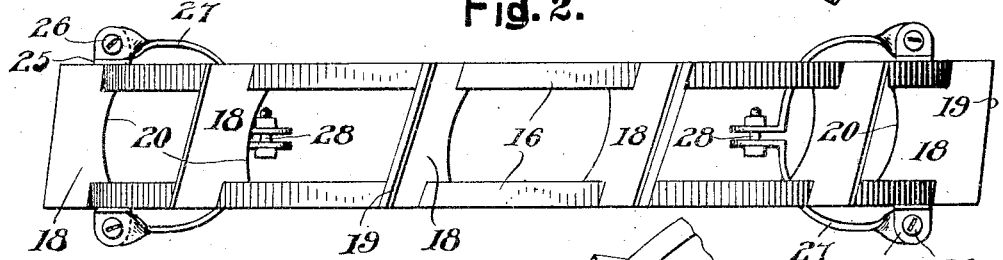
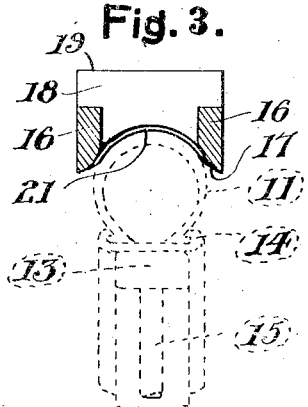
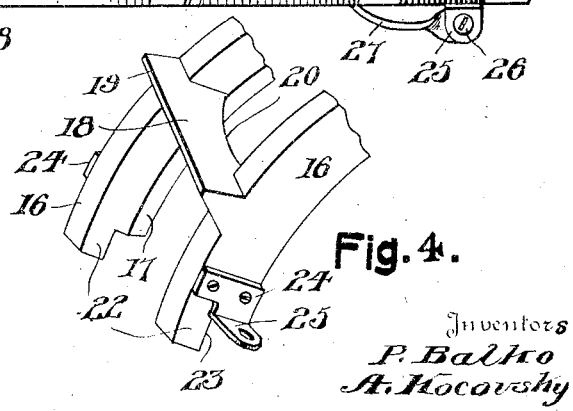
Inventors
P. Balko
A. Kocovsky
By A. M. Wilson
Attorney

UNITED STATES PATENT OFFICE.

PAUL BALKO AND ANTON KOČOVSKÝ, OF MILWAUKEE, WISCONSIN.

NON-SKID DEVICE.

1,236,251. Specification of Letters Patent. Patented Aug. 7, 1917.

Application filed September 15, 1916. Serial No. 120,265.

*To all whom it may concern:*

Be it known that we, (1) PAUL BALKO and (2) ANTON KOČOVSKÝ, (1) a subject of the King of Hungary and (2) a citizen of the United States of America, residing at Milwaukee, in the county of Milwaukee and State of Wisconsin, have invented certain new and useful Improvements in Non-Skid Devices, of which the following is a specification.

This invention relates to new and useful improvements in non-skid devices.

The primary object of the invention is the provision of a two part non-skid device adapted for ready attachment to an automobile wheel whereby the dirt of the roadbed will be laterally diverted during travel.

A further object of the device is the provision of a non-skid device for wheels adapted for removable attachment to the tread portion of the rubber tires thereof and having suitable attaching means as well as being provided with means in contact with the tire tread to prevent the device from creeping thereon.

With these general objects in view and others that will appear as the nature of the invention is better understood, the same consists in the novel combination and arrangement of parts hereinafter fully described, illustrated in the accompanying drawing and then claimed.

In the drawing forming a part of this application and in which like designating characters refer to corresponding parts throughout the several views:—

Figure 1 is a side elevation of a wheel provided with the present device, portions being broken away.

Fig. 2 is an edge view of the device removed from the wheel.

Fig. 3 is a radial sectional view taken upon line III—III of Fig. 1, and

Fig. 4 is a detail perspective view of an end portion of one of the non-skid members.

Referring more in detail to the drawing, the device consisting of two substantially semi-circular non-skid sections 10 is herein illustrated in Fig. 1 operatively mounted upon the tread portion of the pneumatic tire 11 of a wheel 12 having the usual felly 13, rim 14 and spokes 15.

The sections 10 are preferably formed of metal that is light in weight and consists of parallel side strips 16 having beveled edges 17 upon their inner or concave faces and a plurality of spaced non-skid plates 18 are obliquely positioned in parallelism spanning the strips 16, the said plates having sharpened outer edge portions or blades 19 projecting outwardly of the strips 16 adapted for engaging the road-bed during the travel of the wheel 12 thereover when the device is operatively assembled thereon. The inner curved faces 20 of the plates 18 are corrugated as illustrated at 21 in Fig. 1 of the drawing for engaging the tread portion of the tire 11 adapted to prevent the sections 10 from creeping around the tire or slipping relatively thereto.

The adjacent free ends 22 of the strips 16 are provided with coöperating notches 23 forming a loose joint between the two sections 10 when assembled, the said ends 22 however being at all times slightly separated from each other. The side brackets 24 are carried by the end portions 22 having perforated ears 25 through which bolts 26 are removably positioned adapted for securing the sections together upon the tire 11. Retaining yokes 27 formed in two parts detachably connected together by a bolt 28 are arranged with their outer ends secured to the bolts 26, the said yokes passing between the spokes 15 within the rim 14 and felly 13 and securely clamped in such position by means of said bolts 28, the bolts 26 acting as hinge bolts for the opposite adjustable portions of the yokes.

From this detailed description of the device, the manner of construction as well as the manner of attaching the sections 10 upon a wheel with the non-skid plate portions 19 projecting outwardly from the tire will be at once apparent. During the travel of the wheel 12 over the road-bed, the sections 10 are retained in their seated positions upon the tire 11 by means of the yokes 27 and are prevented from slipping along the tire by means of the corrugations 21 which engagingly contact the tire tread, while the oblique arrangement of the plates 18 throws the particles of the road-bed laterally instead of directly in the rear of the vehicle with which the device is provided. If desired to throw the dust outwardly at the sides of the road, the plates 18 upon the opposite wheels of the vehicle will converge forwardly being oppositely arranged upon the opposite wheels while if it is desired to throw the dirt inwardly of the wheels the plates 18 will be arranged to converge rearwardly, a separate pair of the sections 10 being provided for each opposite wheel of the vehicle and the plates 18 thereof being oppositely inclined.

What is claimed as new is:—

A non-skid device for tires, as a unit conforming to the general peripheral outline of the tire and including essentially opposite spaced semi-circular members, each member consisting of parallel plates in width adapted to extend inwardly along the lateral portions of the tire to a certain depth thereof and to overlie the periphery of the tire to a limited extent, said parallel plates having arranged at their ends angular members with one wing thereof secured laterally to said plates and the other wing thereof outstanding edgewise to said plates, said edgewise disposed wings of said angular members having connected thereto the outer ends of the halves or sections of two-part yokes, said yokes being adapted to clamp against the inner circumference of the wheel-felly, the inner ends of said yoke-sections being bolted together.

In testimony whereof we affix our signatures.

PAUL BALKO.
ANTON KOČOVSKÝ